United States Patent
Tse (10) Patent No.: US 9,684,559 B1
(45) Date of Patent: Jun. 20, 2017

(54) METHODS AND APPARATUS FOR STORING ERROR CORRECTION INFORMATION ON A MEMORY CONTROLLER CIRCUIT

(71) Applicant: Altera Corporation, San Jose, CA (US)

(72) Inventor: Clement C. Tse, Fremont, CA (US)

(73) Assignee: Altera Corporation, San Jose, CA (US)

( * ) Notice: Subject to any disclaimer, the term of this patent is extended or adjusted under 35 U.S.C. 154(b) by 112 days.

(21) Appl. No.: 14/261,985

(22) Filed: Apr. 25, 2014

(51) Int. Cl.
*G11C 29/00* (2006.01)
*G06F 11/10* (2006.01)

(52) U.S. Cl.
CPC .................. *G06F 11/1008* (2013.01)

(58) Field of Classification Search
CPC .................................................. G06F 11/1008
See application file for complete search history.

(56) References Cited

U.S. PATENT DOCUMENTS

| | | | |
|---|---|---|---|
| 6,604,214 B1 * | 8/2003 | Fukushima | G06F 11/1008 365/185.33 |
| 6,941,493 B2 | 9/2005 | Phelps | |
| 7,203,889 B2 | 4/2007 | Oza et al. | |
| 8,386,905 B2 | 2/2013 | Chu | |
| 8,458,572 B1 | 6/2013 | Vlaiko | |
| 8,473,815 B2 | 6/2013 | Chung et al. | |
| 8,484,529 B2 | 7/2013 | Alves et al. | |
| 8,621,318 B1 | 12/2013 | Micheloni et al. | |
| 8,656,257 B1 | 2/2014 | Micheloni et al. | |
| 2007/0011574 A1 * | 1/2007 | Weiss et al. | 714/763 |
| 2007/0226592 A1 * | 9/2007 | Radke | 714/766 |
| 2008/0163029 A1 * | 7/2008 | Hirano | G06F 11/1064 714/764 |
| 2009/0070651 A1 * | 3/2009 | Diggs | G06F 11/1068 714/752 |
| 2011/0289387 A1 * | 11/2011 | Roohparvar | G06F 11/1072 714/768 |
| 2013/0170296 A1 | 7/2013 | Yun | |
| 2015/0006826 A1 * | 1/2015 | Yong | 711/147 |

* cited by examiner

*Primary Examiner* — Sam Rizk (57) ABSTRACT

A memory controller circuit is disclosed. The memory controller circuit is coupled to an external memory device. The memory controller circuit selectively generates error-correction information for a user input. The selection is based on whether the user input is one of predefined inputs. In order to facilitate that, the memory controller circuit includes a command processor circuit and a memory circuit. The error-correction information is stored within the memory circuit located within the memory controller circuit. Selectively generating the error-free correction information may significantly reduce the amount of memory storage that is required within the memory controller circuit.

20 Claims, 6 Drawing Sheets

METHODS AND APPARATUS FOR STORING ERROR CORRECTION INFORMATION ON A MEMORY CONTROLLER CIRCUIT

BACKGROUND

A memory controller circuit may be used for controlling data transmission between a memory device and an integrated circuit. Types of data transmission include writing data into the memory device or reading data from the memory device. However, the data that is read from the memory device may oftentimes include errors due to multiple factors including: the age of the memory device, transient signal failure within the memory device, or impinging alpha particles causing soft errors in the memory device.

Therefore, the memory controller circuit may include additional circuitry that performs error detection and error correction on the read data. A commonly used error detection/correction method is based on the error-correcting code (ECC) technique.

However, the ECC technique generates multiple parity bits for every data that is written into the memory device. As such, a relatively large amount of memory or storage may be needed to store the generated parity bits. Furthermore, implementing the ECC technique on a memory controller circuit generally requires a large printed circuit board (PCB), which is often not desired in most cost constrained applications. In addition to that, having these additional memory devices may increase power consumption.

SUMMARY

Embodiments described herein include an apparatus and methods for storing error-correction information on a memory controller circuit. It should be appreciated that the embodiments can be implemented in numerous ways, such as a process, an apparatus, a system, a device, or a method. Several embodiments are described below.

In one embodiment, a memory controller circuit may include a command processor circuit and a memory circuit. The memory controller circuit may be coupled to an external device (e.g., an off-chip memory device). The command processor circuit may be used to determine whether a user input received by the memory controller circuit is one of a number of predefined inputs. The memory circuit, which is coupled to the command processor circuit, may be utilized to store error-correction information associated with the received user input when the user input is one of the predefined inputs.

In another embodiment, a method of operating a memory controller circuit that is coupled to an external memory device is disclosed. The method is performed using the memory controller circuit. The method may include a step to receive first and second user inputs. In one embodiment, the first user input has a level of criticality that is higher than that of the second user input. In such scenarios, error-correction information for the first user input may be generated and error-correction information for the second user input may not be generated. Once the error-correction information is generated, the method includes a step of storing the error-correction information into a memory circuit that is part of the memory controller circuit.

Further features of the invention, its nature and various advantages will be more apparent from the accompanying drawings and the following detailed description of the preferred embodiments.

DETAILED DESCRIPTION

The following embodiments describe an apparatus and methods for storing error-correction information within a memory controller circuit. It will be obvious, to one skilled in the art, that the present exemplary embodiments may be practiced without some or all of these specific details. In other instances, well-known operations have not been described in detail in order not to unnecessarily obscure the present embodiments.

Figure 1:
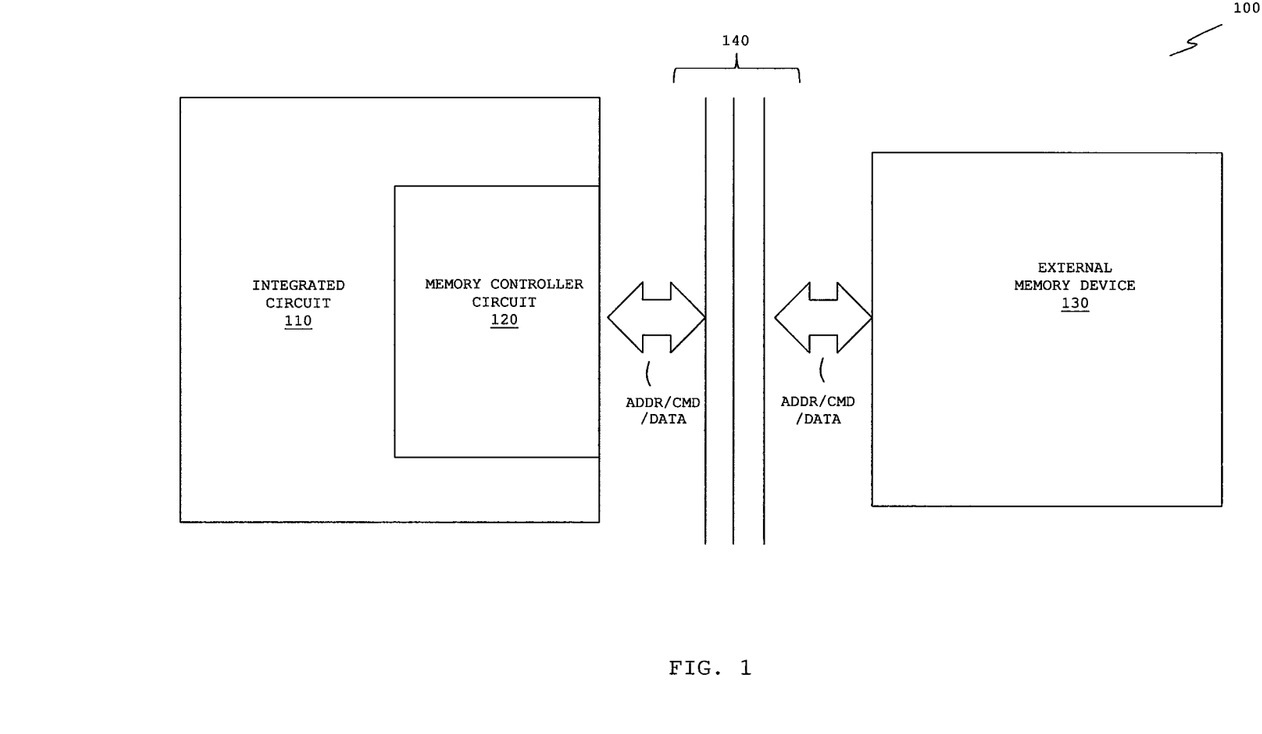
FIG. 1 shows an illustrative circuit system that includes an integrated circuit coupled to a memory device in accordance with one embodiment of the present invention.

FIG. 1, meant to be illustrative and not limiting, shows a circuit system in accordance with one embodiment of the present invention. Circuit system 100 includes integrated circuit 110 and external memory device 130. Circuit system 100 may be formed on a printed circuit board (not shown) and integrated circuit 110 and external memory device 130 may be discrete electronic components placed on the printed circuit board. Alternatively, circuit system 100 may be implemented within a system-on-chip device (also not shown) whereby integrated circuit 110 and external memory device 130 are mounted on a substrate of the system-on-chip device and are encapsulated as one discrete device.

In one embodiment, circuit system 100 may form part of any system of which one wants to reduce the cost of using error-correction code (ECC) with an external memory. For example, but not limited, circuit system 100 may be part of an automotive electronic system, such as a driver assistance system (e.g., processing circuits to process information from a forward camera, a rear-view camera or a surround-view camera), an infotainment system (e.g., circuits to control a head unit or a rear-seat entertainment system) or an electrical vehicle system (e.g., circuits for a hybrid/electronic vehicle (EVehicle)). Circuit system 100 may be also part of an industrial electronic system, such as, functional safety, motor motion and machine vision systems.

Integrated circuit 110 in circuit system 100 may be an application specific integrated circuit (ASIC) device or an application specific standard product (ASSP) device. Alternatively, integrated circuit 110 may be a programmable logic device (PLD), for example, a field programmable gate array (FPGA) device. External memory device 130 in circuit system 100 may be a dynamic random access memory (DRAM) device, a flash memory device, a synchronous random access memory (SRAM) device, a magnetoresistive random access memory (MRAM), a phase change random access memory (PRAM) or other suitable memory devices.

In the embodiment of FIG. 1, integrated circuit 110 is coupled to external memory device 130 via data bus 140. Data bus 140 includes multiple parallel transmission paths. In one embodiment, data bus 140 may have thirty transmission paths. Each transmission path may be utilized for transmitting a command (CMD) signal, an address (ADDR) signal or a data (DATA) signal.

Integrated circuit 110 may process user inputs that are received through data bus 140. In one exemplary embodiment, integrated circuit 100 may process the inputs received from sensors or actuators of a mechanical system (e.g. an automotive system). In another exemplary embodiment, integrated circuit 100 may process user inputs that are received through a computer interface. Integrated circuit 110 may generate appropriate response outputs based on the received inputs.

Integrated circuit 110 communicates with data bus 140 through the terminals of integrated circuit 100 (not shown). In one exemplary embodiment, integrated circuits 110 may include data terminals, command terminals and address terminals. The terminals on integrated circuit 110 may be coupled to respective transmission paths within data bus 140. As an example, a data terminal on integrated circuit 110 may be coupled to a transmission path that is designated to transmit data signals on data bus 140. Similarly, a command terminal and an address terminal on integrated circuit 110 may be coupled to transmission paths on data bus 140 that are designated to transmit command signals and address signals, respectively, to external memory device 130.

External memory device 130 may store data input during a write operation or provide a stored data input during a read operation. The terminal allocation for external memory device 130 may be similar to integrated circuit 110. Hence, in one embodiment, external memory device 130 may include data, command and address terminals. The terminals may accordingly be coupled to corresponding transmission paths on data bus 140.

Integrated circuit 110 may therefore transmit a command signal, a data signal or an address signal to external memory device 130 through its respective command terminal, data terminal or address terminal. Accordingly, integrated circuit 110 may receive a data signal from external memory device 130 through a data terminal of external memory device.

Referring still to FIG. 1, memory controller circuit 120 is formed in integrated circuit 110. Memory controller circuit 120 may be formed using hard intellectual property (IP) circuit blocks, or alternatively, using soft IP blocks. It should be noted that soft intellectual property blocks may be formed using programmable logic elements integrated circuit 110. Memory controller circuit 120 may control the transmissions of data signals between external memory device 130 and integrated circuit 110. In order to facilitate the control of data signal transmissions, memory controller circuit 120 may include various sub-circuits (not shown in FIG. 1).

Figure 2:
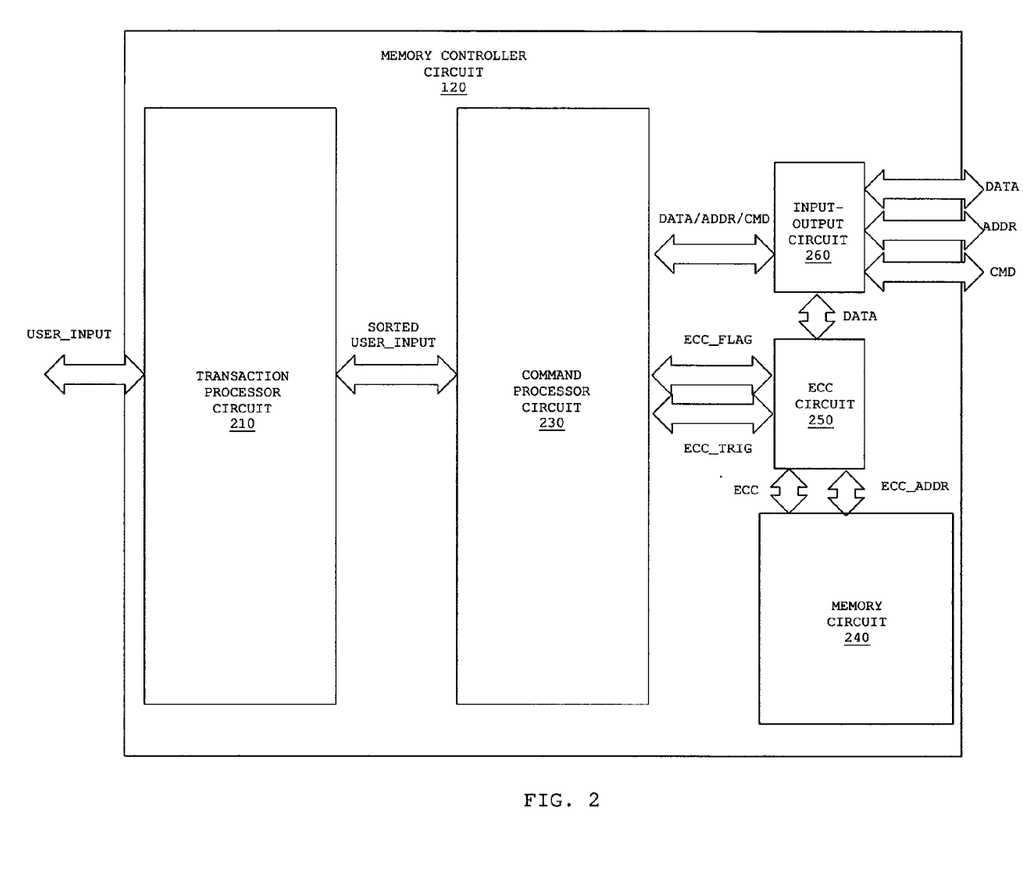
FIG. 2 shows an illustrative memory controller circuit in accordance with one embodiment of the present invention.

FIG. 2, meant to be illustrative and not limiting, shows an implementation of a memory controller circuit in accordance with one embodiment of the present invention. It should be noted that memory controller circuit 120 may be a detailed implementation for memory controller circuit 120 of FIG. 1. Memory controller circuit 120 includes transaction processor circuit 210, command processor circuit 230, input-output (IO) circuit 260, error-correction code (ECC) circuit 250 and memory circuit 240.

Transaction processor circuit 210 may receive user input (i.e., USER_INPUT) from other circuits in integrated circuit 110 of FIG. 1 (e.g. a processor circuit that processes computer executable code). In one embodiment, the user input may include a read or write instruction for memory controller circuit 120. Hence, based on the received instruction, memory controller circuit 120 may be placed in either a read mode (e.g., when reading a stored data signal from an external memory device) or a write mode (e.g., when writing data to the external memory device). As such, the user input may include data and a corresponding address in the external memory device when memory controller circuit 120 is in a write mode. Alternatively, when memory controller circuit 120 is in a read mode, the user input may include a read address.

In one embodiment, multiple user inputs may be received at transaction processor circuit 210. Hence, transaction processor circuit 210 at any particular instance may be processing multiple read and write instructions. Transaction processor circuit 210 may include logic circuits to sort out the sequence of the read and write instructions. In one embodiment, the read and write instructions may be sorted in a sequential manner (i.e., first-in-first-out sequence). In another embodiment, the read and write instructions may be sorted in an optimized manner (e.g., stacking read and write instructions that use the same rows or columns of a memory device to minimize access time).

Command processor circuit 230 is coupled to transaction processor circuit 210. Command processor circuit 230 receives a sorted user input (SORTED_USER_INPUT) from transaction processor circuit 210. Command processor circuit 230 may generate output signals that may be transmitted through various terminals on the integrated circuit (e.g. ADDR, CMD and DATA terminals). Command processor circuit 230 may generate different signals based on the received user input. For example, when a read instruction is received, command processor circuit 230 may generate read command signals. The read command signals and the address signals may be transmitted to the external memory device through the CMD and ADDR terminals on the integrated circuit. Alternatively, command processor circuit 230 may generate write command signals based on the user input to place memory controller circuit 120 in the write mode. The write command signals, the data signals and the address signals are transmitted to the external memory device through the respective CMD, DATA and ADDR terminals on the integrated circuit.

Command processor circuit 230 may determine whether the received data contains a predefined level input. In one embodiment, the predefined level input may be programmed into command processor circuit 230 through user-programmable inputs. The predefined level input may include critical information, for example, operating system data, system calibration data, and system boot-up data. It should be appreciated that these data are critical in order for a system to operate effectively. Any corruption in the data may adversely affect the function of the circuit system. For example, the operating system data may be used to load computer software to a computer system. Any disruption in the operating system data may hinder the loading of the computer software, which may render the computer system inoperable. A particular received data is classified as critical information or non-critical information because of the limited resources (i.e., limited size of memory circuit 240) available within memory controller circuit 120. Alternatively, command processor circuit 230 may classify critical-ness level according to retrieval frequency of a piece of data from an external memory device (e.g., external memory device 130 of FIG. 1). It should be appreciated that the more frequent a piece of data is retrieved; the criticalness level of that piece of data may be higher. Referring still to FIG. 2, input-output circuit 260 is coupled to command processor circuit 230 and ECC circuit 250. Input-output circuit 260 may be a signal gateway for memory controller circuit 120. Input-output circuit 260 may enable transmission of signals between memory controller circuit 120 and an external device (e.g., external memory device 130 of FIG. 1). In one embodiment, input-output circuit 260 may be coupled to data bus 140 of FIG. 1, which is further coupled to external memory device 130 (or other devices that are not shown) in circuit system 100 of FIG. 1.

During a write operation, input-output circuit 260 receives the address signals, the data signals and the write command signals from command processor circuit 230. Alternatively, during a read operation, input-output circuit 260 receives the address signals and the read command signals from command processor circuit 230 and data signals from the external memory device.

Referring still to FIG. 2, ECC circuit 250 is coupled to input-output circuits 260, command processor circuit 230 and memory circuit 240. ECC circuit 250 functions during both operations (i.e., read and write operations). In one embodiment, a simultaneous read and write operations may require two ECC circuits.

During a write operation, when a command processor circuit 230 has determined the received data (i.e., DATA) is one of a predefined input, command processor circuit 230 may trigger ECC circuit 250 (i.e., ECC_TRIG) to generate an error-correction information (i.e. ECC) and an error-correction information address (i.e., ECC_ADDR) based on the received data. The error-correction information address ECC_ADDR is an address in memory circuit 240 where the generated ECC may be stored. Alternatively, when command processor circuit 230 determines the received data is not one of a predefined input, command processor circuit 230 does not trigger ECC circuit 250.

During a read operation, when command processor circuit 230 has determined the received data (i.e., DATA) is one of a predefined input, command processor circuit 230 may trigger ECC circuit 250 (i.e., ECC_TRIG) to generate an error-correction information address (i.e., ECC_ADDR) that corresponds to the received data stored within memory circuit 240 and retrieve an ECC from that address of memory circuit 240.

In addition to that, ECC circuit 250 may compare newly generated parity bits of the data received from the external memory device and the error-correction information (i.e., ECC) stored in memory circuit 240. The newly generated parity bits may be generated by ECC circuit 250 using the data received from the external memory device. When the bits of the newly generated parity bits and the error-correction information are identical, then the data is free from errors. However, when the newly generated parity bits and the bits of the error-correction information are different, then the data may be erroneous. Accordingly, ECC circuit 250 may assert a signal ECC_FLAG to indicate to command processor circuit 230 that there is any error in the received data.

When the received data is erroneous, ECC circuit 250 may also perform error corrections steps. In one embodiment, ECC circuit 250 may be able to correct a single bit or a dual bit erroneous within the received data.

It should be appreciated that the error-correction information is generated using the Hamming algorithm. The Hamming algorithm generates parity bits, which are appended to bits of the received data. In one embodiment, the Hamming algorithm generates the parity bits according to the number of bits in the received data. It should be appreciated that the number of parity bits (m) may be used for at least $2^m-m-1$ data bits. For example, three parity bits may be used for at least four data bits (i.e., $2^3-3-1$), four parity bits may be used for at least eleven data bits (i.e., $2^4-4-1$) and five parity bits may be used for at least twenty six data bits (i.e., $2^5-5-1$). As an example, data with a bit sequence of '100100' (i.e., six bits of data) may have parity bits sequence of '1100' (i.e., four parity bits). A person skilled in the art appreciates how the data bit sequence of '100100' may generate a parity bit sequence of '11100.'

In one embodiment, memory circuit 240 may be a synchronous random access memory (SRAM) circuit. It should be noted that the size of memory circuit 240 may depend on the size of the external memory device (e.g., memory device 130 of FIG. 1). In one exemplary embodiment, the size of memory circuit 240 may be 128 kilobyte (kB) when the external memory device has a size of 1 megabyte (MB).

Figure 3:
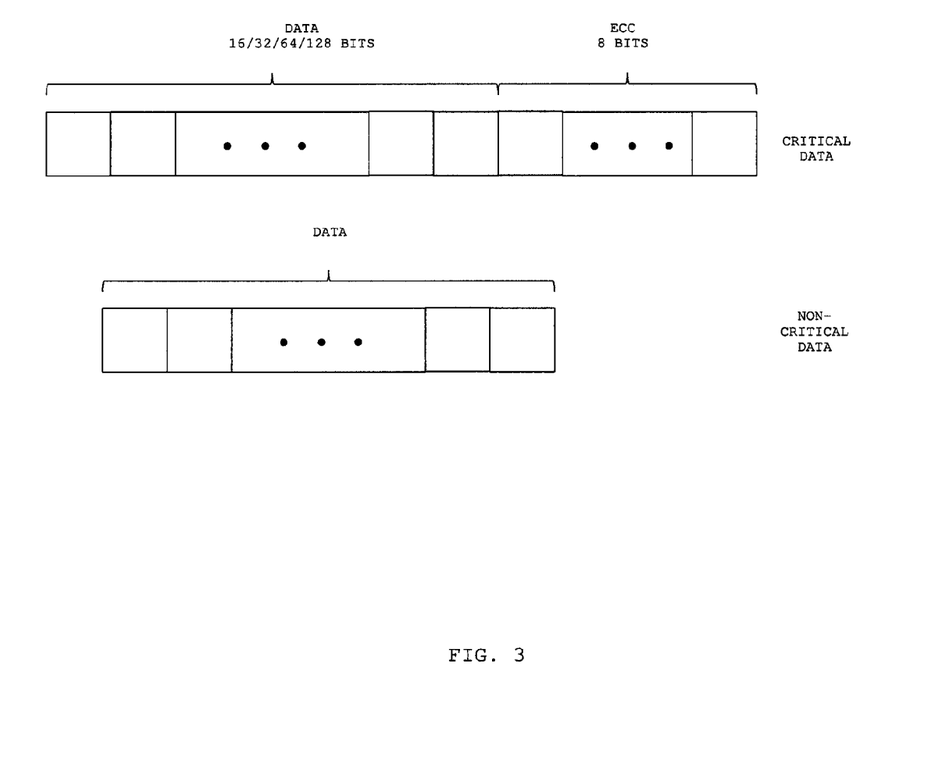
FIG. 3 shows illustrative data that is one of predefined level inputs and illustrative data that is not one of the predefined level inputs.

FIG. 3, meant to be illustrative and not limiting, illustrates a predefined data input and a non-predefined data input in accordance with embodiments of the present invention. The predefined level input may be similar to the predefined level data input described above with reference to FIG. 2 whereas non-predefined data is any data that is not the predefined level data inputs. In one exemplary embodiment, the non-predefined data may include graphical information, user information and etc. The total number of bits for each of the data may be 16 bits, 32 bits, 64 bits or 128 bits. In one embodiment, the predefined data input may include eight bits of error-correction information. As shown in FIG. 3, the eight additional bits may be appended at the end of the predefined data input. As described above with reference to FIG. 2, the 8-bit error-correction information may be generated by an ECC circuit (e.g., ECC circuit 250 of FIG. 2) using the Hamming algorithm.

Figure 4:
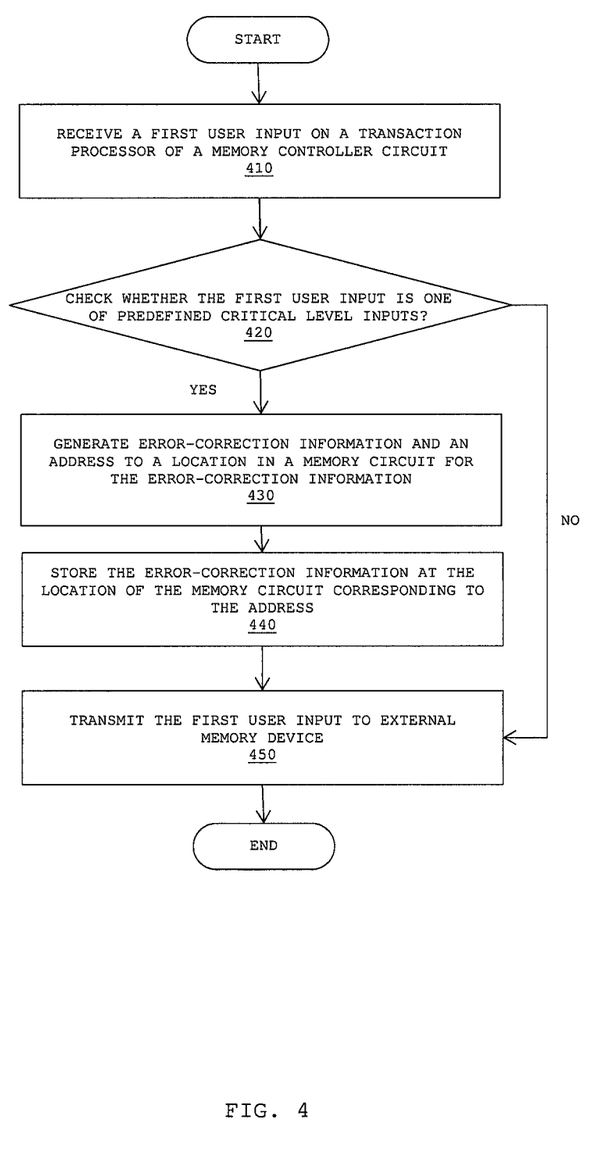
FIG. 4 shows a flowchart of illustrative steps for operating a memory controller circuit during a write operation in accordance with one embodiment of the present invention.

FIG. 4, meant to be illustrative and not limiting, shows steps for operating a memory controller circuit during a write operation in accordance with one embodiment of the present invention. As an example, the memory controller circuit may be similar to memory controller circuit 120 of FIG. 2. The memory controller circuit may be coupled to an external memory device via a data bus such as external memory device 130 of FIG. 1.

At step 410, a first user input is received by a transaction processor circuit within the memory controller circuit. The first user input may include data, address and command inputs that are received from a processor circuit executing computer executable instructions. In one embodiment, the transaction processor circuit may be similar to transaction processor circuit 210 of FIG. 2. The transaction processor circuit may arrange the order of read and write instructions within the memory controller circuit.

At step 420, a command processor circuit (e.g., command processor circuit 230 of FIG. 2) may determine whether the first user input is a predefined level input. As described in FIG. 2, a predefined level input may include operating system data, system calibration data and system boot-up data. If the first user input is not a predefined level input, the first user input may be transmitted directly to an external memory device at step 450.

If the first user input is a predefined level input, error-correction information and the address where the error-correction information is to be stored within a memory circuit of the memory controller circuit is generated at step 430. The error-correction information and the address may be generated by an ECC circuit. In one embodiment, the error-correction information and the address may be similar to ECC and ECC_ADDR, respectively, of FIG. 2. In addition to that, the memory circuit may be similar to memory circuit 240 of FIG. 2. As described in FIG. 2, the error-correction information may be generated using the Hamming algorithm. At step 440, the error-correction information is stored at the address location within the memory circuit. At step 450, the first user input is transmitted to an external memory device.

Figure 5:
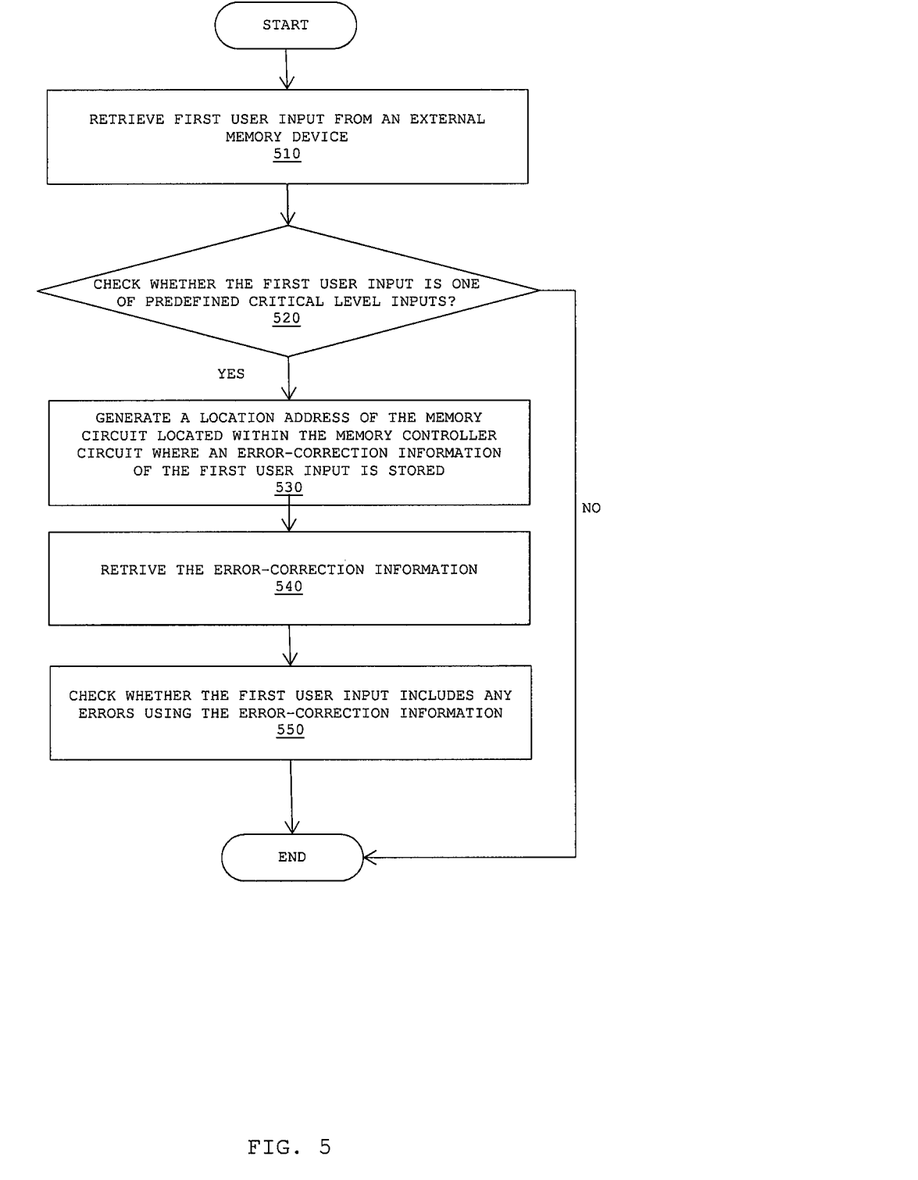
FIG. 5 shows a flowchart of illustrative steps for operating a memory controller circuit during a read operation in accordance with one embodiment of the present invention.

FIG. 5, meant to be illustrative and not limiting, shows steps for operating a memory controller circuit during a read operation in accordance with one embodiment of the present invention. As an example, the memory controller circuit may be similar to memory controller circuit 120 of FIG. 2 and the memory controller circuit may be coupled to an external memory device such as memory device 130 of FIG. 1.

At step 510, the memory controller circuit retrieves a first user input from the external memory device. The first user input may be a data input that is requested by the user from the external memory device. In one embodiment, the request for the first user input from the external memory device may a read command and an address in the external memory device.

At step 520, the memory controller circuit (or more specifically, a command processor circuit within the memory controller circuit) determines whether the first user input is a predefined level input. If the first user input is a not a predefined level input, the read operation is complete at this stage.

If the first user input is a predefined level input, at step 530, the command processor circuit within the memory controller circuit generates a location address of the memory circuit located within the memory controller circuit. The error-correction information of the first user input may be stored at the location address generated by the command processor circuit. In one embodiment, the address for the error-correction information may be similar to ECC_ADDR as shown in FIG. 2.

At step 540, the error-correction information is retrieved from the location address of the memory circuit. At step 550, using the retrieved error-correction information, the first user input is checked for errors. In one embodiment, the checking of the first user input for errors may be performed by an ECC_CIRCUIT (e.g., ECC_CIRCUIT 250 of FIG. 2). As described above with reference to FIG. 2, the first user input may be checked by generating multiple parity bits for the first user input and comparing the generated parity bits with the error-correction information retrieved from the memory circuit. As an example, the first user input may contain an error if the first user input that is read from the memory device is '100101' and the error-correction information that is retrieved from the memory circuit is '0110,' since the parity bit that is generated for '100101' is '1111.' In one embodiment, if the first user input contains an error, an error-correction flag (e.g., ECC_FLAG of FIG. 2) may be asserted.

Figure 6:
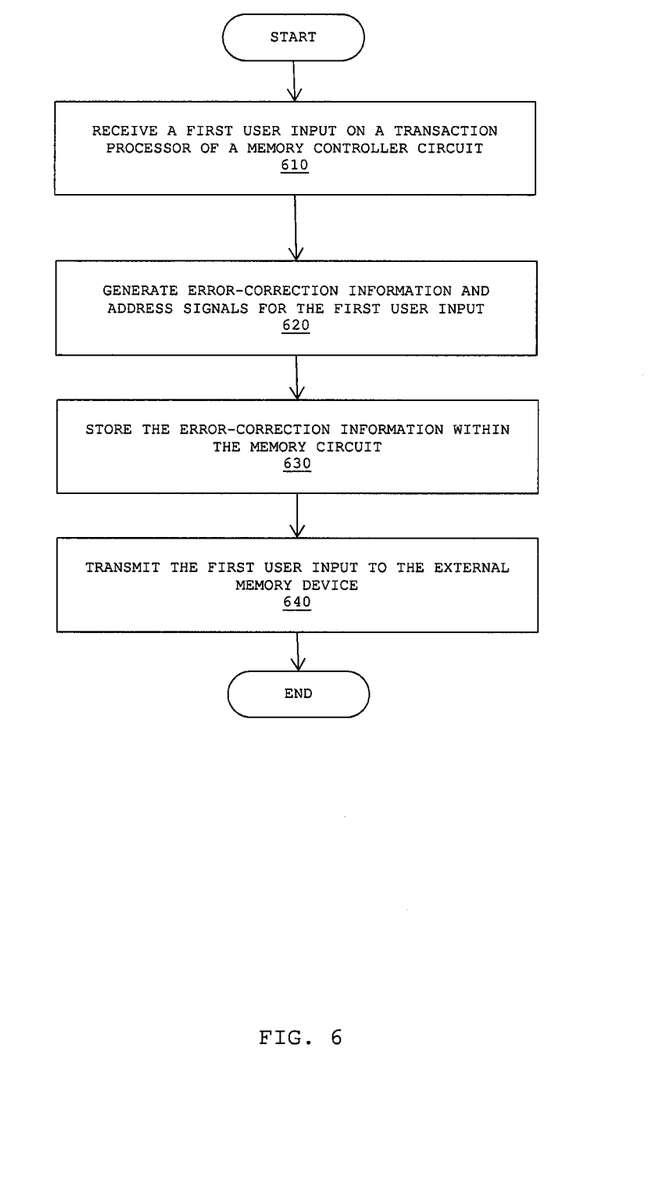
FIG. 6 shows a flowchart of illustrative steps for operating a memory controller circuit for storing error-correction information within a memory circuit on a memory controller circuit in accordance with one embodiment of the present invention.

FIG. 6, meant to be illustrative and not limiting, shows steps for storing error-correction information in a memory circuit within a memory controller circuit in accordance with one embodiment of the present invention. Similar to FIGS. 4 and 5, the memory controller circuit and memory circuit may be similar to memory controller circuit 120 and memory circuit 240 of FIG. 2 respectively. Steps 610-640 may be similar to the respective steps 410, 430-450 of FIG. 4. The steps shown in FIG. 6 may generate error-correction information for all user inputs. Therefore, the steps in FIG. 6 show that there is no checking of an input being a predefined level input. In one embodiment, the steps in FIG. 6 may be utilized in a system where all user inputs are critical. Therefore a memory controller circuit may not be a need to distinguish one user input from another user input. As an example, in a telecommunication system, each user input is important in order to reconstruct a message. Hence, error-correction information is generated for every user input. However, in order to store error-correction information every user input, a relatively large memory circuit may be required. In one exemplary embodiment, a 1 MB memory device with a word size of 32 bits may require a 256 kB memory circuit with a word size of 7 bits.

The embodiments thus far have been described with respect to integrated circuits. The methods and apparatuses described herein may be incorporated into any suitable circuit. For example, they may be incorporated into numerous types of devices such as programmable logic devices, application specific standard products (ASSPs), and application specific integrated circuits (ASICs). Examples of programmable logic devices include programmable arrays logic (PALs), programmable logic arrays (PLAs), field programmable logic arrays (FPGAs), electrically programmable logic devices (EPLDs), electrically erasable programmable logic devices (EEPLDs), logic cell arrays (LCAs), complex programmable logic devices (CPLDs), and field programmable gate arrays (FPGAs), just to name a few.

The programmable logic device described in one or more embodiments herein may be part of a data processing system that includes one or more of the following components: a processor; memory; IO circuitry; and peripheral devices. The data processing can be used in a wide variety of applications, such as computer networking, data networking, instrumentation, video processing, digital signal processing, or any suitable other application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system. In one embodiment, the programmable logic device may be one of the family of devices owned by ALTERA Corporation.

Although the methods of operations were described in a specific order, it should be understood that other operations may be performed in between described operations, described operations may be adjusted so that they occur at slightly different times or described operations may be distributed in a system which allows occurrence of the processing operations at various intervals associated with the processing, as long as the processing of the overlay operations are performed in a desired way.

What is claimed is:

1. A memory controller circuit for communicating with an external memory device, comprising:
   a command processor circuit that determines whether an input is one of a plurality of predefined inputs and outputs a trigger signal in response in response to determining that the input is one of the plurality of predefined inputs; and
   a memory circuit that is coupled to the command processor circuit, wherein the memory circuit stores error-correction information associated with the input only in response to receiving the trigger signal from the command processor circuit.

2. The memory controller circuit as defined in claim 1, further comprising:
an error-correction circuit that is coupled to the command processor circuit and the memory circuit, wherein the error-correction circuit uses the error-correction information stored in the memory circuit to determine whether the input includes errors.

3. The memory controller circuit as defined in claim 2, wherein the command processor circuit generates first address signals for the input that is determined to be one of the predefined inputs, wherein the error-correction circuit generates second address signals for the error-correction information associated with the input, wherein the first address signals are used to address the external memory device, and wherein the second address signals are used to address the memory circuit.

4. The memory controller circuit as defined in claim 1, further comprising:
an input-output circuit that is coupled to the command processor circuit, wherein the input-output circuit transmits the input received from the memory controller circuit to the external memory device when the error-correction information generated by the command processor is conveyed from the command processor circuit to the memory circuit.

5. The memory controller circuit as defined in claim 1, wherein the predefined inputs is selected based on criteria consisting of: frequently used data, operating system data, system calibration data, and system boot-up data.

6. The memory controller circuit as defined in claim 1, wherein the predefined inputs include user-programmable inputs.

7. The memory controller circuit as defined in claim 1, wherein the memory circuit has a storage capacity that is less than that of the external memory device.

8. The memory controller circuit as defined in claim 1, wherein the memory circuit is a static random access memory (SRAM) circuit.

9. A method of operating a memory controller circuit for communicating with an off-chip memory device, comprising:
receiving a first write input having a first level of criticality;
receiving a second write input having a second level of criticality that is lower than the first level of criticality;
generating an error-correction trigger signal for the first write input;
in response to generating the error-correction trigger signal, generating error-correction information for the first write input without generating error-correction information for the second write input; and
storing the error-correction information only in a memory circuit that is a part of the memory controller circuit.

10. The method as defined in claim 9, further comprising:
transmitting the first and second write inputs to the off-chip memory device.

11. The method as defined in claim 9, further comprising:
generating address signals corresponding to a location for which the error-correction information is to be stored within the memory circuit.

12. The method as defined in claim 11, further comprising:
receiving a read input from the off-chip memory device, wherein the read input has the same level of criticality as the first write input;
generating different address signals corresponding to a location for which error-correction information of the read input is stored within the memory circuit; and
retrieving the error-correction information for the read input from the memory circuit.

13. The method as defined in claim 12, further comprising:
determining whether the read input includes errors.

14. The method as defined in claim 9, further comprising:
determining a level of criticality for each of the first and second write inputs according to a predefined hierarchy of criticality; and
transmitting a command to the error-correction circuit that directs the error-correction circuit to produce the error-correction information for the first write input.

15. The method as defined in claim 9, wherein the first write input is selected from a group consisting of: frequently used data, operating system data, system calibration data, and system boot-up data.

16. The method as defined in claim 9, wherein the error-correction information is generated according to a Hamming code algorithm.

17. A method of operating a memory controller circuit that communicates with an external memory device, comprising:
receiving a write input for the external memory device at the memory controller circuit;
determining whether the write input is critical data;
generating an error-correction trigger in response to determining that the write input is critical data;
generating an error-correction information for the write input only in response to generating the error-correction trigger; and
storing the error-correction information into a memory circuit that is part of the memory controller circuit.

18. The method as defined in claim 17, further comprising:
generating address signals corresponding to a location for which the error-correction information is to be stored in the memory circuit.

19. The method as defined in claim 17, further comprising:
receiving a read input from the external memory device; and
generating address signals corresponding to a location for which an error-correction information for the read input is stored on the memory circuit.

20. The method as defined in claim 19, further comprising:
retrieving the error-correction information of the read input from the memory circuit; and
determining whether there are errors within the read data using an error-correction circuit.

* * * * *